Jan. 5, 1932.   P. A. ELFERS   1,840,228
PILOT PRESSURE CONTROL
Filed Jan. 14, 1930   3 Sheets-Sheet 2
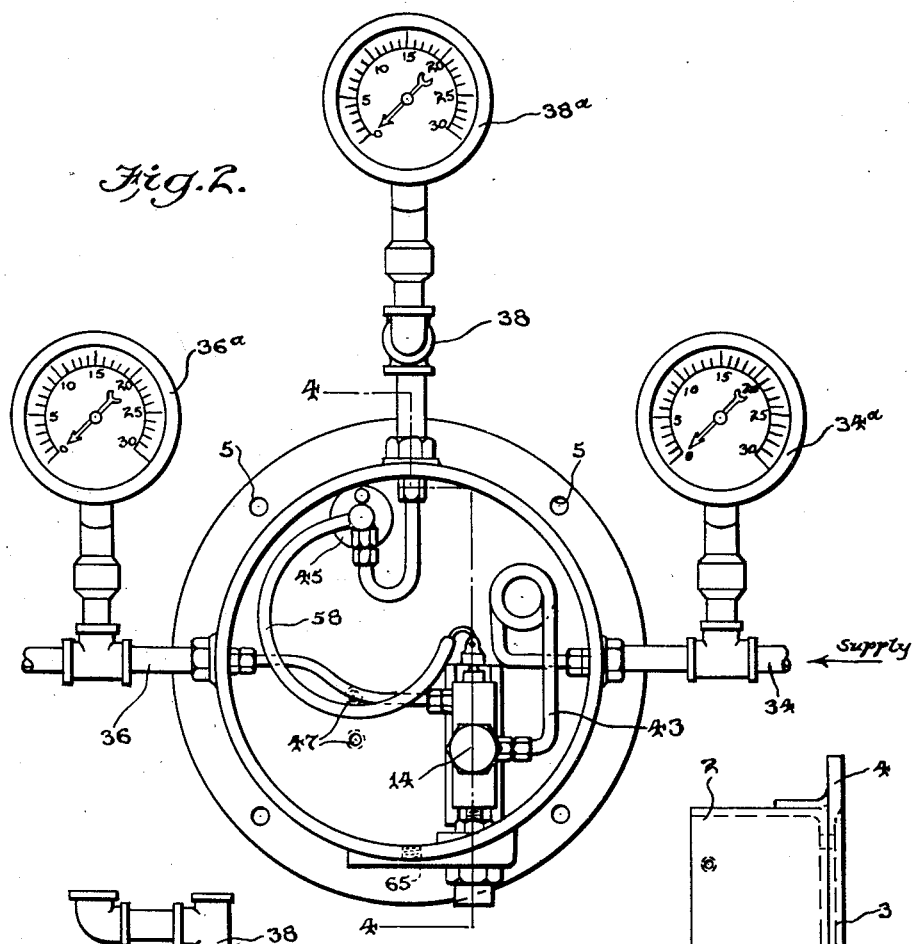
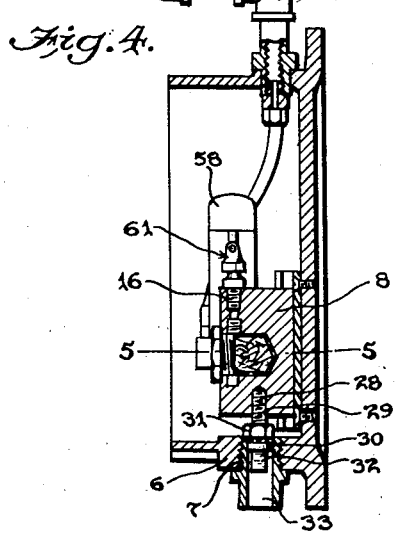
Inventor
P. A. Elfers,
By George A. Prevost
Attorney

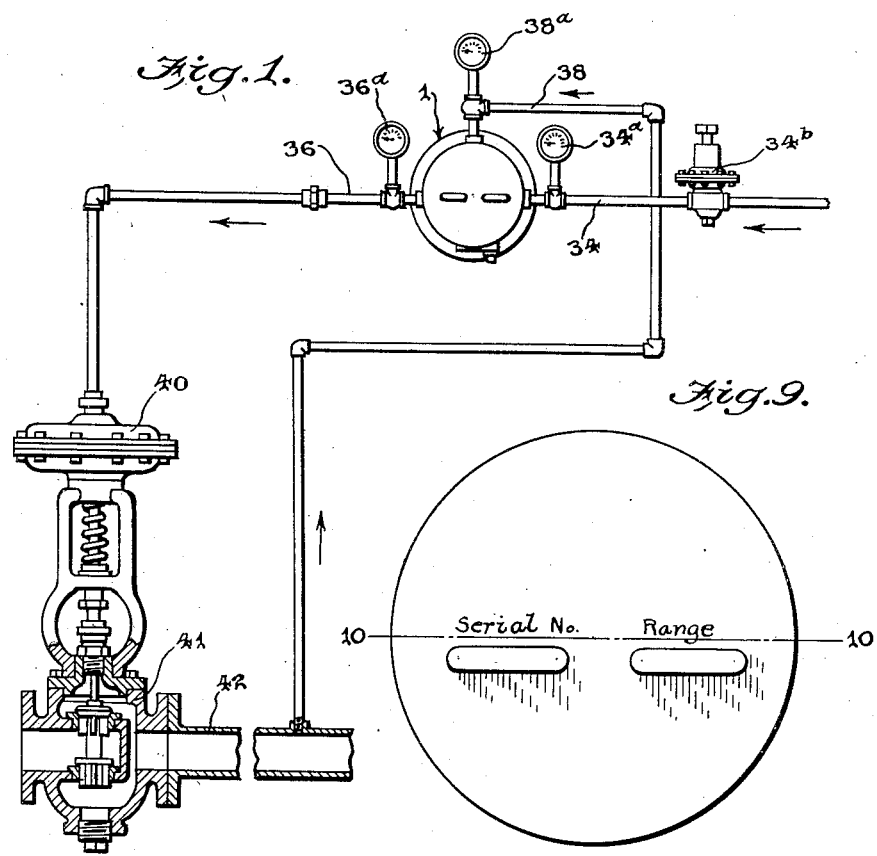

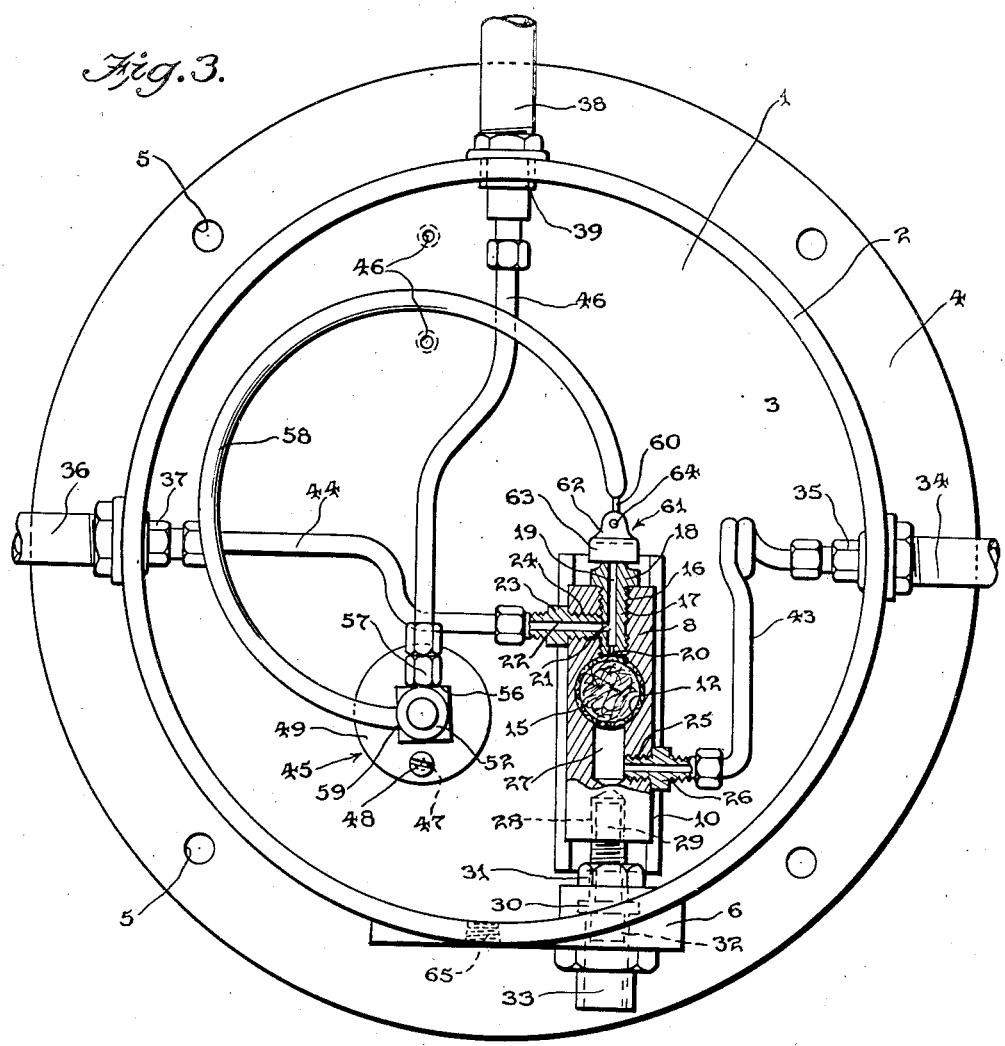

Patented Jan. 5, 1932

1,840,228

UNITED STATES PATENT OFFICE

PAUL A. ELFERS, OF MARSHALLTOWN, IOWA, ASSIGNOR TO THE FISHER GOVERNOR COMPANY, OF MARSHALLTOWN, IOWA

PILOT PRESSURE CONTROL

Application filed January 14, 1930. Serial No. 420,732.

My invention consists in new and useful improvements in a pilot control device and is particularly adapted for use in controlling the pressure of fluids such as air, water, gas, steam, oil and other liquids, passing through pipe lines, or contained in tanks.

The object of my invention is to provide a control including a conduit for conducting an auxiliary fluid for operating a valve governing the fluid to be controlled, with outlet means interposed in said conduit, and a valve for throttling the outlet of said auxiliary fluid.

Another object of the invention resides in an adjustable valve block having a strainer and removable valve seat therein, said valve seat, in addition to its main port, having a restricted orifice at its inner extremity through which the operating or auxiliary fluid must pass to continue to the main valve diaphragm or to escape through said outlet.

Still another object of my invention is to provide a device of this character which will maintain the pressure of said fluids at a constant point and which is extremely sensitive to variations of pressure in a pipe line or tank.

A further object of my invention is to provide a pilot control device which may be used interchangeably as a direct action control or a reverse or inverted action control, according to the conditions to be met and the apparatus in which the device is to be installed.

A still further object of the invention is to provide an adjustable valve which is capable of opening and closing completely or to a slight degree to cause a throttling action on the auxiliary operating medium.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 is a view showing a typical installation of the device in connection with a pipe line for controlling the pressure of the fluid passing therethrough, the main valve effected by the pilot control, being shown in section.

Figure 2 is an enlarged front view of the pilot control with the front cover removed to illustrate the working parts, the various elements being assembled for use as a direct acting control.

Figure 3 is an enlarged front view similar to Fig. 2 but illustrating the device when assembled for reverse or indirect action.

Figure 4 is a sectional view taken on line 4—4 of Fig. 2, illustrating the adjustable block for regulating the valve seat.

Figure 5 is a sectional view taken on line 5—5 of Fig. 4, further illustrating the adjustable block.

Figure 6 is a view of one part of the Bourdon tube support.

Figure 7 shows both parts of the Bourdon tube support, assembled.

Figure 8 is a side view of the housing,

And Figures 9 and 10 are plan and sectional views respectively of the housing cover.

In the drawings 1 represents the control housing or casing which is composed of any suitable material and while shown as cylindrical in shape, it may be square, oblong, elliptical or any desired shape to suit conditions and requirements.

In the form illustrated, the housing 1 comprises a cylindrical wall 2 secured to a circular base 3 extending beyond the confines of the wall in a surrounding flange 4, the latter being drilled at predetermined points as at 5 to facilitate mounting. At a suitable point on the lower portion of the wall 2, I provide a thickened portion or base 6 which is apertured and threaded as at 7, (Fig. 4), to receive the adjusting mechanism for the adjustable pilot valve block 8 as hereinafter described in detail.

The block 8 is rectangular in shape and composed preferably of monel or bronze, although it may be made of any suitable material such as steel or stainless iron. In its side walls near its rear face, said block 8 is provided with longitudinally extending grooves 9 adapted to register with a channel guide 10 or other suitable guide means secured to the base 3 of the housing by a screw 11, whereby said block is adapted to be moved longitudinally. The central portion of the block 8 is provided with a transverse recess or chamber 12, which extends substantially three quarters of the depth of the block 8 and is threaded at its mouth 13 to receive a screw plug 14. This recess 12 is adapted to accommodate a strainer 15 for the auxiliary or operating fluid, which may be of any suitable type, but preferably consists of a capsule formed of wire mesh screen containing wool felt, said strainer being retained in place by means of the plug 14.

16 represents a drill and threaded aperture extending longitudinally in the block 8 from its upper end and opening into the strainer chamber 12, perpendicular thereto. This aperture 16 is adapted to receive the threaded extension 17 of a valve seat 18, said valve seat being enlarged and adapted to close the upper end of said aperture. The valve seat structure is centrally and longitudinally drilled from its upper end at 19 to form a port which extends to a point near the lower end of the extension 17. It is also drilled longitudinally from its lower end as at 20 to form a substantially smaller port than that designated as 19, both of said ports 19 and 20 being in alignment and in communication with one another. Instead of drilling an additional port 20 in the extension 17 of the valve seat, a small disc provided with a restricted orifice or port may be inserted in the aperture 16 at its lower end and secured in place by any suitable means such as soldering, brazing or screw threading.

The valve extension 17 is provided with a transverse port 21 which communicates with the longitudinal port 19 at its inner end, and with the port 22 of a threaded plug 23 which is screwed into a transverse threaded aperture 24 in the block 8. The extension 17 is circumferentially recessed adjacent the port 21 to insure the communication of the ports 21 and 22.

Toward the lower end of the block 8 on the side opposite the plug 23, I provide another transverse threaded aperture 25 adapted to receive a threaded and ported plug 26 which is in communication with the strainer chamber 12 by means of a conduit 27.

From its lower end, the block 8 is drilled and threaded longitudinally as at 28 to receive a threaded stem or adjusting screw 29 which is collared as at 30 in the base 6 and provided with a lock nut 31 for retaining the same in the desired position. The lower end 32 of the adjusting stem 29 is squared to accommodate a suitable instrument employed for adjusting the block 8, said instrument being inserted from the lower end of a threaded tube 33 screwed into the aperture 7 in the base 6 as clearly shown in Fig. 4.

The wall 2 of the housing 1 is transversely apertured to receive the ends of three fluid lines, 34 leading from the source of auxiliary operating pressure, 36 leading to the diaphragm 40 of the main valve 41, and 38 leading from a predetermined point in the main pipe line 42 for conveying the control pressure, which may be reduced pressure, relief pressure or boiler pressure as the case may be. The line 34 is placed in communication with the ported plug 26 by means of a flexible coiled tubing 43 secured to the end of said line 34 by a suitable adapter or connection 35. The line 36 communicates with the ported plug 23 through the medium of a flexible tube 44 and suitable adapter 37, and the line 38 is placed in communication with a Bourdon tube support 45, hereinafter described, through the tube 46 secured to the end of said line by the adapter 39.

The base 3 of the housing 1 is provided with two pairs of threaded apertures 46 and 47 whereby the Bourdon tube support 45 may be interchangeably mounted by means of screws 48.

The support 45 consists of two parts, a base part 49 in the form of a circular disc, drilled to accommodate the screws 48 and provided centrally with a transverse tubular member or neck 50, said neck being apertured as at 51 to receive a suitable set screw. The other part of the support 45 consists of a body portion 52 reduced at its longitudinal extremities to form legs 53 and 54 and provided centrally with a transverse lug 55, said lug being centrally apertured as at 55a to communicate with the interior of said body portion. At right angles to the lug 55, the body portion 52 is tapped as at 56 to receive the coupling 57 (Fig. 3) for securing the lower end of the tube 46, whereby the line 38 is placed in communication with the interior of the said body portion and the port 55a of the lug 55. Either of the legs 53 and 54 is adapted to be inserted within the neck 50 of the base 49 and retained in place by means of the set screw at 51.

58 represents a Bourdon spring tube open at one end 59 to fit over the lug 55 of the support 45 whereby said tube is placed in communication with the line 38, its outer or free end being closed and carrying a valve support 60 for the valve 61. This valve member preferably consists of a spun brass retainer 62 recessed on its lower face for receiving and holding a composition disc 63 of any suitable material which will be unaffected by corrosive gases, gasoline and other materials which generally tend to deteriorate a rubber composition disc. The valve 61 is secured to the support 60 by means of the screw 64 in such a manner as to permit said valve to be angularly adjustable with respect to the valve seat 18 for regulating the throttling action of the valve.

If the apparatus is to be assembled as in Fig. 2 for a direct action of the valve 61, the leg 54 of the Bourdon tube support 45 is slipped into the neck 50 and secured in place by the set screw, the base 49 being fastened in the upper portion of the housing 1 by means of screws 48 in the pair of threaded apertures 46.

For indirect action of the valve 61, the Bourdon tube support is installed as shown in Fig. 3 with the base 45 secured in the lower portion of the housing 1 by means of the pair of threaded apertures 47 and screws 48. With this assembly the body portion 52 of the support is reversed and the leg 53 thereof, inserted in the neck 50 of the base and secured in place by the set screw.

In the first instance, it will be noted that an increase in pressure in the Bourdon tube will close the valve while in the other case or indirect type an increase in pressure in the Bourdon tube will open the valve.

In order to permit the escape of and carry off the operating fluid discharged from the valve 61, I provide an aperture 65 in the wall 2 of the housing which may accommodate a suitable escape line.

Having thus described the construction and assembly of my improved pilot control, its installation and operation are as follows:

Referring to Fig. 1, the housing 1 containing the pilot control device is fastened to a suitable support with the lines 34, 36 and 38 connected at their respective points with suitable gauges 34a, 36a and 38a applied in the usual manner. As before stated, the line 34 leads from a source of auxiliary operating pressure fluid which is preferably air or gas but may be water or other suitable liquid, said line 34 being provided with an auxiliary reducing valve 34b for maintaining a constant pressure at all times in the inlet conduit and the interior elements. This is necessary due to the fact that any change in the pressure of the fluid in the inlet conduit, would be transmitted to the main valve diaphragm without a change in the position of the Bourdon tube, which, naturally, would prevent the proper action of the control. The line 38 is connected into the main pipe line 42 at the desired point for conducting the control pressure to the Bourdon tube, and the line 36 leads to the diaphragm 40 which controls said main valve 41, said lines 34 and 36 being in communication by means of the valve block 8 heretofore described.

It is obvious that instead of a pipe line, the valve 42 may be installed in a boiler or tank, in which event the line 38 would lead from the latter.

When the valve 61 is upon its seat 18, the auxiliary pressure coming in through the line 34 passes into the block 8 up through the strainer chamber 12 and through the restricted port 20, which may vary from #10 drill to #120 drill, and into the aperture 19 which varies in size from #1 drill to #100 drill. This fluid will now build up its pressure in the line 36 leading to the diaphragm of the valve 41 and tend to close said valve.

If the valve 61 is partially seated at 18 initially, the pressure in the line 36 will increase until the point is reached at which the bleed or escape of operating medium at 18 is just sufficient or equal to the amount entering or passing the restricted port 20, the pressure being thus maintained at a constant point.

The movement of the Bourdon tube caused by an increase or decrease in pressure in the main pipe line results in a new position of the valve 61 and will in turn effect a change in the amount of supply medium escaping at the seat 18. The pressure in the line 36 will immediately rise or lower until it has reached the point at which the escape of the supply medium at 18 is again equal to the amount of fluid passing the restricted port 20.

In order to enable the valve 61 to come in contact with its seat, regardless of what may be the pressure in the Bourdon tube, since said tube expands or tends to straighten at a definite point when a definite pressure is applied thereto, I have provided the adjustable sliding block 8 controlled by the screw or stem 29 by means of its squared end 32, as hereinbefore described in detail.

It will be noted that the valve seat 18 and its extension 17, the lower end of which is provided with the reduced port 20, are integral and may be removed from the block 8 at will, said extension 17 being threaded in such a manner as to provide a very snug fit, thus assuring that no fluid can by-pass but must pass through the said restricted port 20.

To obtain a throttling action, the valve 61 is tilted on its support 60 so that it strikes the seat 18 at an angle, hence the supply pressure through the line 36 does not build up as rapidly. This is due to the fact that the size or area of the opening between the valve and valve seat is not reduced as rapidly per unit movement of the Bourdon tube. The greater the angle or the further the valve is from seating squarely, the greater becomes the throttling action, which is desirable in a number of instances where close control must be obtained with a steady flow of fluid.

The operation of the direct and indirect action assembly is identical, with the exception above noted that one opens the valve with an increase of pressure in the Bourdon tube and the other closes the valve.

In an installation as shown in Fig. 1, where the pressure in a pipe line is to be governed, the control device would be assembled for direct action as shown in Fig. 2.

In this case an increase in pressure in the main pipe line would be transmitted to the Bourdon tube and cause the same to close the valve 61, which would permit the auxiliary operating pressure to build up in the line 36, reducing the pressure in the main pipe line through the closing action of the main valve.

An example of the indirect assembly of the control elements as shown in Fig. 3, would be its use as a relief governor in a boiler or the like, in which case an increase in pressure in the boiler beyond the point desired, would be transmitted to the Bourdon tube which would open the valve 61 and permit the escape of the auxiliary operating fluid at 18, thereby reducing the pressure in the line 36 and permitting the main valve to open and reduce the pressure being controlled.

In some instances it may be desirable to install my improved device in connection with a main valve having an inverted inner valve instead of the type shown in Fig. 1.

From the foregoing it is believed that the construction and advantages of my improved pilot control will be apparent to those skilled in the art, it being borne in mind that numerous changes may be made in the details of the construction without departing from the spirit of the invention as set forth in the following claims. For instance, as before stated, the housing 1 may be made of any desired shape, the block 8 may be made stationary and a similar adjustment obtained on the Bourdon tube element by suitable means, or the valve seat ports 19 and 20 may be separated and the strainer formed as a separate unit.

What I claim and desire to secure by Letters Patent is:—

1. In a pressure control device, a conduit for conducting a valve operating fluid, an element interposed in said conduit, an outlet in said element for said fluid, a valve for controlling said outlet, said element being adjustable with respect to said valve, a restricted orifice in said element through which said fluid must pass to continue in said conduit or escape through said outlet, a second conduit for the fluid to be controlled and means actuated by the fluid in said second conduit for operating said valve.

2. In a pressure control device, the combination with a casing, of a conduit for conducting an operating pressure fluid for controlling a main valve governing the pressure to be regulated, a ported element interposed in said conduit and adjustably mounted in said casing, a jet flow outlet in said element for said operating fluid, a valve seat in said outlet and a valve for controlling the same, a strainer in said element, a second conduit for the fluid to be controlled and a Bourdon tube in communication therewith and actuated by said fluid for controlling said outlet valve.

3. Apparatus as claimed in claim 2, wherein said valve for controlling the outlet is adjustable, whereby the throttling action of said outlet may be regulated.

4. Apparatus as claimed in claim 2 including means whereby said Bourdon tube may be interchangeably mounted in said casing to cause said outlet valve to act directly or indirectly.

5. A pressure control device including a casing, a conduit for conducting a valve operating fluid, an outlet for said fluid interposed in said conduit, a valve for controlling said outlet, a second conduit for the fluid to be controlled and a Bourdon tube actuated by the fluid in the second conduit for operating said valve, and means whereby said Bourdon tube may be interchangeably mounted in said casing to cause said valve to act directly or indirectly.

6. In a pressure control device, a conduit for conducting a valve operating fluid, a ported block adjustably mounted on a suitable guide member, interposed in said conduit, an outlet in said block for said fluid, a valve for controlling said outlet, means for adjusting the position of said block, a second conduit for the fluid to be controlled, and means actuated by the fluid in said second conduit for operating said valve.

7. Apparatus as claimed in claim 6, wherein the outlet in said block is provided with a removable valve seat, having a longitudinal extension into said block, a restricted orifice in the inner extremity of said extension, whereby any fluid passing through said conduit or outlet must pass said restricted orifice, and a screw stem for adjusting said block.

8. Apparatus as claimed in claim 5, wherein said last named means comprises a Bourdon tube support, including a base, means for mounting said base in a plurality of positions in said casing, a ported body portion having a projecting ported lug adapted to engage the open end of said Bourdon tube, and a plurality of legs arranged on said body to interchangeably fit into said base member.

9. In a pressure control device, a conduit for conducting a valve operating fluid, an element interposed in said conduit, an outlet in said element for said fluid, a valve for controlling said outlet, a second conduit for the fluid to be controlled, and means actuated by the fluid in said second conduit for operating said valve, said element being adjustable with respect to said valve.

10. The combination with a pressure control device including a casing, a conduit for conducting an operating pressure fluid for controlling a main valve governing the pressure to be regulated, a second conduit for the fluid to be controlled and a Bourdon tube in communication therewith and actuated by said fluid, of a ported element interposed in said first named conduit and adjustably mounted in said casing, a jet flow outlet in said element for said operating fluid, a valve seat in said outlet, a valve mounted on the end of said Bourdon tube for engagement with said valve seat to control said jet flow outlet, and means for adjusting said element within said casing for regulating the relative position of said outlet with respect to said valve.

11. Apparatus as claimed in claim 10 wherein the mounting for said adjustable element comprises a guide member secured to said casing, said element being recessed at predetermined points to register with and slidably engage said guide member.

12. Apparatus as claimed in claim 10 wherein the mounting for said adjustable element comprises a guide member secured to said casing, said element being recessed at predetermined points to register with and slidably engage said guide member, the means for adjusting said element consisting of a threaded stem rotatably secured in the wall of the housing, one end thereof engaging a threaded recess in said element, the other end being shaped to accommodate a suitable instrument, whereby when said stem is rotated in either direction, said element will be caused to slide in said guide member, and means for maintaining the proper adjustment.

13. Apparatus as claimed in claim 10 wherein said valve is adjustable on said Bourdon tube to regulate its angle of contact with said valve seat.

14. The combination with a pressure control device including a casing, a conduit for conducting an operating pressure fluid for controlling a main valve governing the pressure to be regulated, a second conduit for the fluid to be controlled and a Bourdon tube in communication therewith and actuated by said fluid, of a porter element interposed in said first named conduit and secured in place within said casing, a jet flow outlet in said element, a valve seat in said outlet, a valve secured to the end of said Bourdon tube and adapted to register with said valve seat to control said jet flow outlet, a strainer and a restricted orifice in the port of said element, through which the operating fluid must pass to continue in said conduit or escape through said jet flow outlet.

15. The combination with a pressure control device including a casing, a conduit for conducting an operating pressure fluid for controlling a main valve governing the pressure to be regulated, a second conduit for the fluid to be controlled and a movable member actuated by said fluid, of a ported element interposed in said first named conduit and adjustably mounted in said casing, a jet flow outlet in said element for said operating fluid, a valve seat in said outlet, a valve secured to said movable member for engagement with said valve seat to control said jet flow outlet, and means for adjusting said element within said casing for regulating the relative position of said outlet with respect to said valve.

16. In a pressure control device, a conduit for conducting a valve operating fluid, an outlet for said fluid interposed in said conduit, a valve for controlling said outlet, a second conduit for the fluid to be controlled and an element actuated by the fluid in the second conduit for operating said valve, said valve being carried by and angularly adjustable on said last named element, whereby its angle of contact with said outlet may be regulated.

17. A pressure control device comprising a conduit for the fluid to be controlled, an auxiliary conduit leading from a separate source of supply for conducting a valve operating fluid, a jet flow outlet member interposed in said auxiliary conduit for permitting the escape of said valve operating fluid, a Bourdon tube actuated by fluid from said first named conduit, and a valve mounted directly on the free end of said Bourdon tube for controlling the outlet in said auxiliary conduit, said valve being adjustable on said Bourdon tube with respect to said outlet member.

In testimony whereof I affix my signature,

PAUL A. ELFERS.